3,158,461
METHOD OF CONTROLLING WEEDS
Edward D. Weil, Lewiston, N.Y., assignor to Hooker Chemical Corporation, Niagara Falls, N.Y., a corporation of New York
No Drawing. Filed May 2, 1960, Ser. No. 25,842
7 Claims. (Cl. 71—2.7)

This invention relates to methods and compositions for the control of undesirable vegetation. More specifically, this invention is the control of weeds by using a composition containing as a principal active ingredient trialkylphosphine oxides or sulfides.

A number of chemicals are known which have utility as plant growth regulators. In the art of plant growth control each of these chemical compounds have a certain spectrum of utility and certain limitations. For example, 2,4-D (2,4-dichlorophenoxyacetic acid) a useful herbicide for control of many dicotyledonous weeds, is useless against most grassy weeds. Various aryl carbamates and aryl ureas are useful herbicides when applied before weed emergence, but inferior when applied to already existing stands of weeds. Various herbicidal oils are useful when applied to the foliage of emerged weeds but ineffectual if applied prior to weed emergence. A continued need exists for herbicides which are effective against both monocotyledonous and dicotyledonous species and which are active when applied both prior and subsequent to weed emergence. A further need exists for compounds which will rapidly kill or desiccate the foliage of plants. It is therefore a primary object of this invention to make available such herbicides, and folier desiccants, and methods for use thereof.

It has now been found that trialkylphosphine oxides and sulfides generally represented by the formula:

where R, R', and R" are equal to monovalent aliphatic radicals each of which has one carbon atom linked directly to phosphorus and where X is equal to oxygen or sulfur; are effective herbicides. This is particularly surprising since the phosphine oxides and sulfides are known to be unusualy chemically stable and unreactive compounds. These compounds are completely lacking in the labile, i.e., reactive P—O—C, P—N—C, P-halogen chemical linkages which are present in all known phosphorus-containing pesticides. The aliphatic radicals may be simple alkyl radicals or may contain olefinic unsaturation. They may be optionally substituted with a substituent selected from the group consisting of halogen, amino, substituted amino, hydroxy, alkoxy and carboxy. Suitable compounds are trimethyl, triethyl, methyldiethyl, tri-n-propyl, triisopropyl, tri-n-butyl, tri-sec-butyl, triamyl, trihexyl, triheptyl, trioctyl, tridecyl, tridodecyl, triheptadecyl, triallyl, tris(hydroxymethyl), tris(chloromethyl), tris(dibutylaminomethyl), tris(carboxymethyl), dimethylcarboxymethyl, tris(chlorobutyl), butyl bis-(chlorobutyl), dibutylchlorobutyl, and tris(dichlorobutyl)-phosphine oxide, and the corresponding phosphine sulfides. The corresponding phosphines or phosphine-CS$_2$ addition compounds may be employed allowing exposure to the action of air which rapidly will convert phosphines to substitute phosphine oxides. The preferred embodiments for reasons of high activity and relatively low costs are the compounds where R, R', and R" are alkyl groups of four to eight carbon atoms. Various phosphorus compounds having halogen, amino, nitrogen, alkoxy or alkylmercaptol radicals bound directly to the phosphorus atom are sometimes in some nomenclatural systems named as phosphorus-substituted phosphines, phosphine oxides, or phosphine sulfides, but such derivatives are in actuality phosphinous, phosphonous, phosphinic, or phosphonic acid derivatives and do not lie within the scope or spirit of this invention. The terms phosphine, phosphine oxides, phosphine sulfides shall herein strictly refer to compounds having three of the valences of the phosphorus atom linked directly to carbon atoms, as employed by Kosolapoff, "Organic Phosphorus Compounds," pages 99 to 120.

The compounds of this invention may be prepared by methods known in the art, such as a reaction of the corresponding alkyl Grignard reagent with phosphorus oxychloride, thiophosphoryl chloride, or by oxidation of the corresponding phosphine by air or by nitric acid, or by sulfurization of the corresponding phosphine by sulfur. These methods are described in the above-mentioned Kosolapoff reference.

Further methods involve carrying out substitution reactions on the alkyl group of phosphine oxides once the latter have been prepared. For example, tri-n-butyl phosphine oxide is chlorinated by the introduction of elemental chlorine at sixty-five degrees centigrade under illumination by a two hundred and fifty watt mercury vapor lamp, until the desired weight uptake of chlorine has occurred, to prepare mono-, di-, tri-, and higher chlorinated tri-n-butyl phosphine oxides. Such halogenated alkyl phosphine oxides may then be further reacted with amines, sodium cyanide, sodium alkoxide or other nucleophilic reagents to effect further replacement of the halogen atoms.

The methods of the invention may be practiced by application of the pure compounds or by application to the soil or to the plants of formulations of these compounds. These formulations may be solutions in a solvent such as water, acetone, alcohol, a hydrocarbon such as benzene, kerosene, diesel oil, crude oil, xylene, or other aromatic or aliphatic hydrocarbons. Solutions in an organic solvent immiscible with water may be further dispersed in water as emulsions by the use of emulsifiers known to the herbicidal art. The formulations may also consist of the active compound on a solid carrier such as clay, carbon, or a vermiculite, with or without wetting and dispersing agents. These formulations may also incorporate other herbicides to supplement, complement, synergize or enhance the herbicidal properties of the active compounds described in the present invention. Since the present active compounds are generally rapid acting they may be advantageously employed in conjunction with slow acting herbicides such as triazine herbicides, aryl, alkyl, urea herbicides or 2,3,6-trichlorophenylacetic acid herbicides. The formulations may also incorporate ingredients to aid in solubilizing the active ingredients, for example, the phosphine oxides may be solubilized by hydrochloric or other acids in aqueous solutions. These formulations may also contain certain adjuvants such as sequestering agents, colorants, wetting, spreading and sticking agents in accordance with the well-known practices in the herbicide art.

The methods of employing these compositions is to apply them to the soil prior to emergence of the weeds. They may be admixed with the soil if desired to aid penetration. They may also be applied to the foliage of emerged weeds and other plants. The application to foliage may be made for the purpose of defoliation or desiccation of the foliage or for the purpose of stunting the plants, as well as for the purpose of completely destroying the plants. For example, the composition when sprayed on corn foliage killed the foliage without injury to the ears, and resulted in the more rapid drying of the ears. This is a useful effect since dried corn can be stored with less deterioration than moist corn. The stunting of trees without causing the death thereof is useful to inhibit the excessive growth of trees under power lines, telephone lines, etc. The desiccation of cotton foliage aids in the harvesting of the bolls. The killing of potato vines aids in the harvesting of potatoes.

The following examples more specifically illustrate this invention.

EXAMPLE 1

A representative herbicidal composition of the invention is the following:

| | Parts by weight |
|---|---|
| Tributyl phosphine oxide | 10 |
| Xylene (solvent) | 10 |
| Atlox 3335 (polyoxyethylene emulsifier) | 2 |

This mixture is emulsified with water in any convenient proportion for spraying.

EXAMPLE 2

A second represenative formulation of the invention is the following:

| | Parts by weight |
|---|---|
| Trioctyl phosphine oxide | 1 |
| Diesel oil | 10 |

This mixture may be sprayed as is, or further diluted as desired with diesel oil or kerosene.

EXAMPLE 3

Variations of the chemical of the invention were applied at the rate of sixteen pounds per acre to the surface of soil seeded on the preceding day with a number of representative weed species. An untreated control plot was seeded at the same time. Approximately two weeks later, when the weeds in the control plot has germinated and were vigorously growing, the condition of the weeds in the treated plots was recorded. The data obtained is presented in Table I.

*Table I*

| Species | Observed Weed Control [1] | | | |
|---|---|---|---|---|
| | Control | Tri-n-Butyl Phosphine Oxide | Triamyl Phosphine Oxide | Tri-n-Hexyl Phosphine Oxide |
| Foxtail | 0 | 2 | 3 | 2 |
| Dock | 0 | 4 | 4 | 3 |
| Mustard | 0 | 4 | 4 | 3 |
| Lamb's-quarters | 0 | 4 | 4 | 3 |
| Pigweed | 0 | 3 | 4 | 3 |
| Chickweed | 0 | 4 | 4 | 4 |

[1] 0=no effect; 1=slight inhibition; 2=moderate inhibition; 3=severe damage and inhibition, likely to lead to eventual death; 4=total kill or prevention of emergence.

EXAMPLE 4

On a series of plots containing emerged and actively-growing weeds, various of the chemicals of the invention were sprayed with acetone solutions at the rate of eight pounds per acre of active ingredient. The acetone alone produced no effect. After approximately one week, the plots were inspected for herbicidal effects. The data obtained is presented in Table II.

*Table II*

| Species | Control | Tri-n-Butyl Phosphine Oxide | Tri-n-Hexyl Phosphine Oxide | Tris(Di-n-Butylamino Methyl) Phosphine Oxide | Trioctyl Phosphine Oxide |
|---|---|---|---|---|---|
| Quackgrass | 0 | 3 | 3-4 | 2 | |
| Crabgrass | 0 | 3 | 4 | 2 | 3-4 |
| Johnson grass | 0 | 3 | 4 | 2 | |
| Pigweed | 0 | 4 | 4 | 3 | |
| Lamb's-quarters | 0 | 4 | 4 | 2 | |
| Chickweed | 0 | 3 | 3-4 | 2 | |

EXAMPLE 5

Field plots were seeded with millet, perennial ryegrass, and oats as representative grassy species, and sprayed with various chemicals of the invention and several other phosphorous chemicals at the rate of eight pounds per acre. The plots were inspected one month later when these species had emerged and were vigorously growing in the untreated control plots. The observed percent control is given in Table III.

*Table III*

| Chemical | Millet | Ryegrass | Oats |
|---|---|---|---|
| Trihexyl phosphine oxide | 90 | 90 | 90 |
| Tri-n-octyl phosphine oxide | 95 | 95 | 95 |
| Tri-n-butyl phosphine sulfide | 100 | 100 | 70 |
| Tri-n-butyl phosphate | 0 | 0 | 0 |
| Di-n-butyl hydrogen phosphate mixture with n-butyl dihydrogen phosphate | 0 | 0 | 0 |

EXAMPLE 6

An area infested with well-established perennial grasses, mostly quackgrass, and perennial broadleaf weeds, mostly plantain, wild carrot, and goldenrod, was divided into plots and sprayed with diesel oil formulations, similar to those of Example 2, at the rate of eighty gallons of oil per acre containing four pounds per acre of the test herbicide. Comparison plots were also sprayed using eighty gallons per acre and higher rates of the oil alone. The results, in terms of severity of "top kill" foliar destruction were observed three days later, and are tabulated in Table IV.

*Table IV*

| Chemical | Severity of Top Kill | |
|---|---|---|
| | Grasses | Broadleafs |
| (Oil alone, 80 gal./acre) | None | None. |
| (Oil alone, 160 gal./acre) | do | Do. |
| (Oil alone, 320 gal./acre) | None or slight | None or slight. |
| Tri-n-butyl phosphine oxide | Mod.-severe | Mod.-severe. |
| Hexachlorinated tri-n-butyl phosphine oxide. | Severe | Severe. |
| Dodecachlorinated tri-n-butyl phosphine oxide. | Moderately severe | Do. |
| Comparison compounds: | | |
| n-Butyl phosphate (mono-, di-mixtures). | None | None. |
| Trilauryl trithiophosphate | do | Do. |
| Tris(2-chloroethyl) phosphate. | do | Do. |

I claim:

1. A method for the control of plant growth which comprises applying to the media to be treated a phytotoxic amount of a composition having the formula:

where R, R' and R" are monovalent radicals chosen from the group consisting of lower alkyl, lower alkenyl, lower haloalkyl, lower aminoalkyl, lower alkylaminoalkyl, lower dialkylaminoalkyl, lower hydroxyalkyl, lower carboxyalkyl, where R, R' and R" each have one carbon atom linked directly to the phosphorus atom and X is selected from the elements consisting of oxygen and sulfur.

2. The method of claim 1 wherein R, R' and R" are each lower alkyl of from 4 to 8 carbon atoms.

3. The method of claim 1 wherein at least one of the monovalent radicals, R, R' and R", is lower alkyl of 4 to 8 carbon atoms.

4. The method of claim 1 wherein at least one of the monovalent radicals, R, R' and R", is lower alkyl.

5. The method of claim 1 wherein at least one of the monovalent radicals, R, R' and R", is lower haloalkyl.

6. The method of claim 1 wherein at least one of the monovalent radicals, R, R' and R", is lower carboxyalkyl.

7. The method of claim 1 wherein at least one of the monovalent radicals, R, R' and R", is lower dialkylaminoalkyl.

References Cited in the file of this patent

UNITED STATES PATENTS

| | | |
|---|---|---|
| 2,714,064 | Morris et al. | July 26, 1955 |
| 2,844,454 | Birum | July 22, 1958 |
| 2,927,014 | Goyette | Mar. 1, 1960 |

OTHER REFERENCES

"Plant Regulators," National Academy of Sciences, National Research Council, publication 384, CBCC Positive Data Series No. 2, June 1955, pages a, b, c, 1 and 38.